(12) United States Patent
Wang et al.

(10) Patent No.: US 11,587,258 B1
(45) Date of Patent: Feb. 21, 2023

(54) FOCAL LENGTH VALIDATION USING THREE-DIMENSIONAL POSE ESTIMATES

(71) Applicant: GM CRUISE HOLDINGS LLC, San Francisco, CA (US)

(72) Inventors: Yongjun Wang, Pleasanton, CA (US); Daniel Chou, Sunnyvale, CA (US); Nigel Rodrigues, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 0 days.

(21) Appl. No.: 17/523,152

(22) Filed: Nov. 10, 2021

(51) Int. Cl.
| | |
|---|---|
| *G06T 7/80* | (2017.01) |
| *G06T 5/00* | (2006.01) |
| *G01S 17/08* | (2006.01) |
| *G01S 17/86* | (2020.01) |
| *H04N 17/00* | (2006.01) |

(52) U.S. Cl.
CPC ............... *G06T 7/80* (2017.01); *G01S 17/08* (2013.01); *G01S 17/86* (2020.01); *G06T 5/006* (2013.01); *H04N 17/002* (2013.01); *G06T 2207/30244* (2013.01)

(58) Field of Classification Search
CPC ......... H04N 17/002; G06T 5/006; G06T 7/80; G06T 2207/30244; G01S 17/08; G01S 17/86
See application file for complete search history.

(56) References Cited

U.S. PATENT DOCUMENTS

| | | | | |
|---|---|---|---|---|
| 10,488,521 B2 * | 11/2019 | Wang | .................. | G06V 20/647 |
| 10,838,049 B1 * | 11/2020 | Schwiesow | ........... | G01S 7/4972 |
| 10,866,101 B2 * | 12/2020 | Wang | .................... | G01S 17/931 |
| 10,984,554 B2 * | 4/2021 | Lin | ........................ | G06V 20/20 |
| 11,199,614 B1 * | 12/2021 | Gan | ......................... | G01S 17/42 |
| 2011/0157373 A1 * | 6/2011 | Ye | .............................. | G06T 7/85 348/187 |
| 2016/0063706 A1 * | 3/2016 | Gonzalez-Banos | ......................... | H04N 5/23229 348/222.1 |
| 2018/0356831 A1 * | 12/2018 | Luo | ...................... | G06V 10/774 |
| 2018/0357315 A1 * | 12/2018 | Luo | ....................... | G01S 17/931 |
| 2019/0122386 A1 * | 4/2019 | Wheeler | .................. | G06T 7/55 |
| 2021/0082149 A1 * | 3/2021 | Sheorey | ............... | G06T 3/4007 |
| 2021/0158079 A1 * | 5/2021 | Aliamiri | ................. | G01S 17/86 |
| 2022/0132043 A1 * | 4/2022 | Park | ....................... | H04N 5/247 |

* cited by examiner

*Primary Examiner* — Brian P Yenke
(74) *Attorney, Agent, or Firm* — Polsinelli PC

(57) ABSTRACT

A computer-implemented method for focal length validation may include receiving, by a computing system, initial image data for an optical target from a camera. The method may also include determining a distortion parameter associated with the camera, based on the initial image data. The method may also include receiving, by the computing system, a first image of the optical target, wherein the first image is associated with a first position of the camera. The method may also include receiving, by the computing system, a second image of the optical target, wherein the second image is associated with a second position of the camera. The method may also include determining an estimated displacement between the first position of the camera and the second position of the camera based on the first image and the second image. The method may further include determining a focal length based on the estimated displacement and a measured displacement of the camera between the first position and the second position.

20 Claims, 10 Drawing Sheets

NEGATIVE RADIAL DISTORTION "PINCUSHION"

NO DISTORTION

POSITIVE RADIAL DISTORTION "BARREL"

FOCAL LENGTH VALIDATION USING THREE-DIMENSIONAL POSE ESTIMATES

TECHNICAL FIELD

The subject technology provides methods for performing camera focal length validation. In particular, the disclosure provides methods that combine image-based pose estimations and Light Detection and Ranging (LiDAR) measurements for focal length validations.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. In some applications, these systems utilize a perception system (or perception stack), that implements various computing vision techniques in order to reason about the surrounding environment. In some applications, three-dimensional (3D) pose estimation techniques may be used. As discussed in further detail below, a (3D) pose estimation is a computer vision technique that predicts the transformation of an object from a pose or an image and tracks the location of a person or object. The pose estimation is done by using a combination of the pose and the orientation of the person or object.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
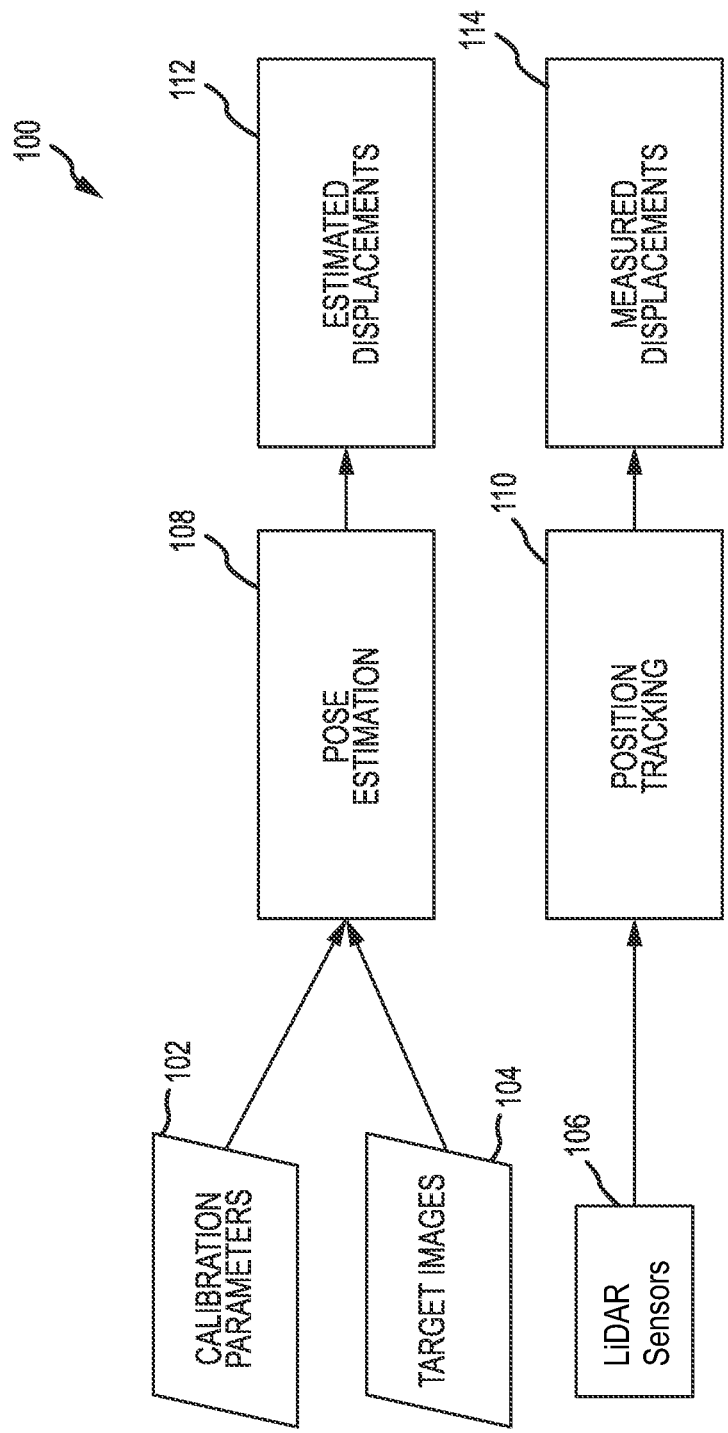
FIG. 1 is a diagram illustrating a method for comparing estimated displacements with measured displacements, according to some aspects of the disclosed technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form to facilitate describing one or more aspects. Further, it is to be understood that functionality that is described as being carried out by certain system components may be performed by more or fewer components than shown.

Validating the precise focal length of optical imaging devices, such as cameras, can be difficult due to the fact that image acquisition is performed behind the lens at a location that is typically inside the device (e.g. camera) housing, making it difficult to precisely measure the location of the lens. However, knowing precise optical parameters for imaging devices is crucial for high-precision applications, such as those used in autonomous vehicles (AVs) that rely on high-accuracy localizations to better reason about the surrounding environment. Aspects of the disclosed technology provide solutions for ascertaining accurate imaging parameters/characteristics, such as focal length parameters, for lens-based imaging devices, such as cameras.

In some approaches, focal lengths can be determined/validated by analyzing and comparing various measures of device displacement. By way of example, a focal length parameter of an imaging device, such as a camera, can be determined by estimating the device displacement between locations where image collection is performed, for example, whereby images of a stationary target are acquired by a camera. By comparing the estimated displacement between locations with an accurate (ground truth), measure of the device displacement, the focal length parameter can be accurately determined/validated. As discussed in further detail below, ground-truth measures of location displacement can be achieved using various measurement means, such as by using a light-based ranging device, such as a LiDAR sensor or a laser ranging device. However, it is understood that such location/distance measurements may be performed using other measurement device, without departing from the scope of the disclosed technology.

The focal lengths can be validated with predicted positions and measured positions of 3D points. The positions of 3D points can be established with both image-based pose estimations and those measured by LiDAR sensors. However, these two methods for position estimations or measurements have some problems. For example, a LiDAR sensor can locate the camera, but cannot determine accurately where the camera sensor is inside the camera. The image-based pose estimations can output positions in camera-frames, but the image-based pose estimations are impacted by calibration inaccuracy. Both the measurements from LiDAR sensors and the image-based pose estimations are needed to construct 3D points in camera-frames accurately.

The accuracy of camera calibrations can be evaluated by computing discrepancies between expected positions based on the camera calibrations and detected positions of known 3D points on an image plane. It is critical to have a reliable and accurate way to acquire 3D data.

A traditional way for camera calibrations is to measure 3D points, then project the 3D points onto a two-dimensional (2D) image plane, then calculate the errors, and estimate the accuracy. The traditional method constructs 3D feature points in camera-frames by measuring features and camera lens/image sensor center using 2D or 3D equipment, which is prone to measurement errors as lens/sense centers and features on checkerboard are hard to locate accurately. The challenge is that it is difficult to know the accurate location of the sensor inside the camera. The problem is solved by correcting estimated camera poses with precisely measured target displacements, then use calibrated pose estimations to construct 3D points in camera coordinates. This way does not need to locate features or camera lens/image centers with instruments.

The disclosed method combines image-based pose estimations and accurate distance measurements by LiDAR sensors or scanners to construct 3D points reliably (e.g. 3D points of the initial position of the camera from which the camera moves to multiple stops or location of the camera center), which are further used to validate camera calibrations by comparing predicted and detected image points.

The disclosed method calibrates image-based pose estimations with LiDAR measurements by moving cameras between stops. Then, the movements between stops measured with LiDAR sensors can be correlated with the image-based pose estimations. A correction can then be applied to image-based pose estimations in an initial position of the camera.

Target positions in all the stops in the camera frame can be constructed by combining the initial position with relative camera movements. Then, 3D points (e.g. corners of checkers) are provided based upon target designs (e.g. checkerboard). Those 3D points can be projected into 2D points with camera calibrations and compare with detected or measured image points to evaluate calibration accuracy.

The disclosed method uses accurately measured distances to calibrate camera pose estimations, and further constructs 3D points directly in camera-frames without locating camera lens or image center or features. This avoids the use of other measurement equipment to locate features or camera lens/image centers.

FIG. 1 is a diagram illustrating the method for comparing estimated displacements with measured displacements, according to some aspects of the disclosed technology. As illustrated in FIG. 1, based upon calibration parameters 102 and target images 104, pose estimation 108 can be made. In some aspects, the calibration parameters 102 can represent a priori calibration estimates of the imaging device being used to collect the target images 104, such as those that may be provided by a camera manufacturer. The target images 104 can be taken by a camera moving to multiple stops. Then, estimated displacements 112 (e.g., between stops) can be determined based upon the pose estimation 108 at each stop. Also, separate measures of camera displacement between stops can be made using a high-accuracy measurement device, such as using an optical (laser) based ranging device 106. Depending on the desired implementation, ranging device 106 may include one or more LiDAR sensors 106, and/or a laser-based ranging device, such as a scanner made by Leica™.

The estimated displacements from the camera images can correlate with the measured displacements. For example, if the images have no distortion, the estimated displacements from the camera are linearly correlated with the measured displacements. A ratio (e.g. slope) can be obtained from the correlation between the estimated displacements and the measured displacements. Then, a focal length can be corrected based upon the ratio. More details will be illustrated in more details later.

Figure 2:
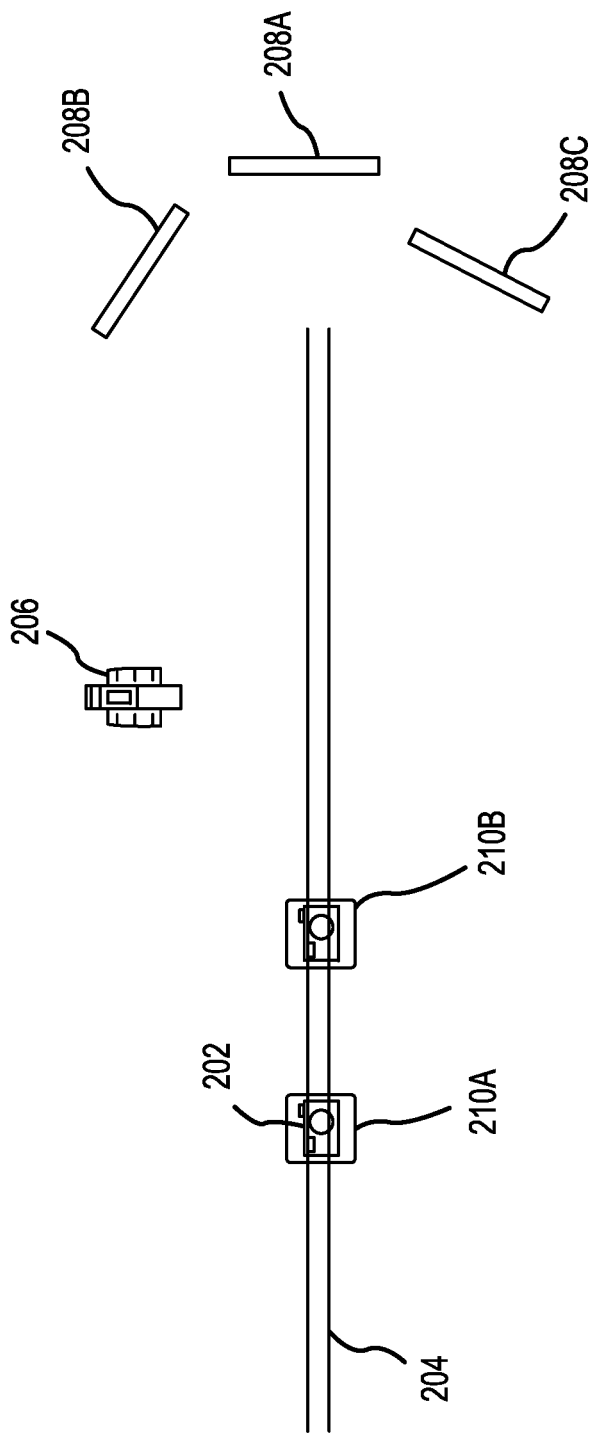
FIG. 2 is a diagram illustrating an example system for implementing the method of FIG. 1, according to some aspects of the disclosed technology.

FIG. 2 is a system diagram that illustrates an example of the method of FIG. 1, according to some aspects of the disclosed technology. As illustrated in FIG. 2, three targets 208A-C are positioned at two different distances from a camera 202 at stops 210A and 210B on a linear stage 204. The targets 208A-C are placed at different angles from the linear stage 204. For example, target 208A is at an angle of 90° or perpendicular to the linear stage 204. Target 208B is at a negative angle from the linear stage 204 while target 208C is at a positive angle from the linear stage 204. A light-based ranging device 206 or a LiDAR sensor is positioned at a distance from the targets 208A-C and also at a distance from the camera 202. The light-based ranging device 206 can measure the position of camera 202 at different stops 210A-B. The measurements by light-based ranging device 206 are from one camera position to another camera position. light-based ranging device 206 does not perform measurements of the distance between the target and the camera.

One may move camera 202 to multiple stops on the linear stage 204 relative to target 208A to determine distances between stops with camera calibration information. One may catch images of the target at each stop by the camera and estimate the displacements between the stops based upon the images. One may also use a light-based ranging device to track the movements of the camera and to measure distances between the stops, and then correlates the estimated displacements with the measured displacements.

The disclosed method uses multiple targets and multiple stops for robust calibrations between LiDAR measurements and image-based pose estimations. Mathematical calculations are provided below for estimating displacements based upon image-based pose estimations.

In some aspects, the method may include correcting an image-based position estimate of the first target at the initial position, constructing 3D points in camera coordinates based upon the corrected image-based position estimate at the initial position and measured displacements, and calibrating the camera.

Figure 3A:
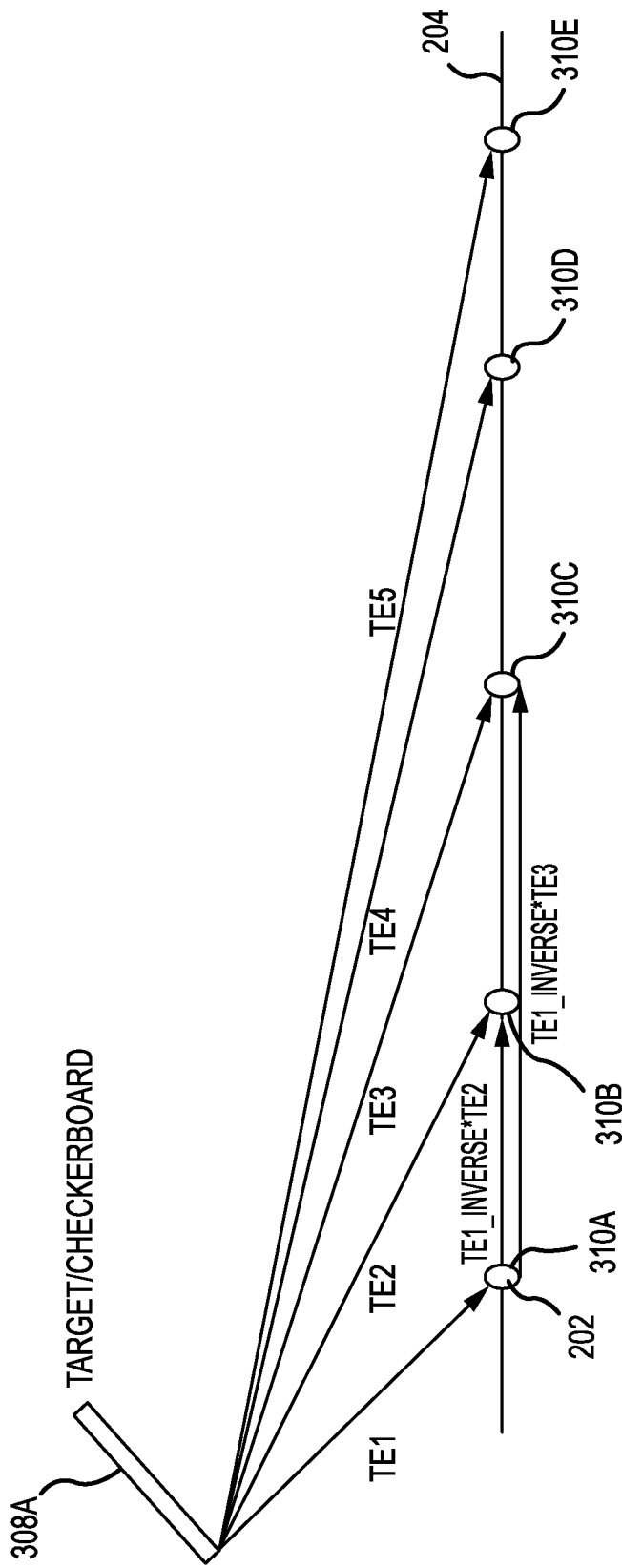
FIG. 3A illustrates example transformations of the camera of FIG. 2 at five different positions with respect to the linear stage of FIG. 2, according to some aspects of the disclosed technology.

FIG. 3A illustrates example transformations of the camera of FIG. 2 at five different positions with a target at an angle less than 90 degrees with respect to the linear stage of FIG. 2, according to some aspects of the disclosed technology.

As shown in FIG. 3A, camera 202 moves on the linear stage 204 from a first stop 310A to four stops 310B-E sequentially. A target 308A is positioned at a distance from stops 310A-B, which is referred to as transformation TE1, TE2, TE3, TE4, TE5 from stops 310A-E, respectively. Relative transformation TEi_rel between Nth stop (where N is an integer equal to or greater than 2) and the first stop can be calculated after the target positions (e.g. TE1-5) at each of stops 310A, 310B, 310C, 310D, and 310E are extracted from images using Eq. (1) as follows:

$$TEi\_rel = TE1\_inverse * TEi \qquad \text{Eq. (1)}$$

The first stop 310A can be used as a reference for LiDAR measurements, then relative transformation TLi between the first stop and another stop (e.g. one of stops 310B-E) can be extracted from the LiDAR measurements, where i is an integer equal to or greater than 1. Then, relative transformations from the images and LiDAR measurements can be compared.

For example, TE1_rel is the relative transformation between the first stop 310A and the second stop 310B and is obtained from the images taken at the first stop 310A and the second stop 310B. TL1 is the relative transformation measured by LiDAR, i.e. the displacement or distance between the first stop 310A and the second stop 310B. TE1_rel can be compared with TL1. Likewise, TE2_rel is the relative transformation between the first stop 310A and the third stop 310C and is obtained from the images taken at the first stop 310A and the third stop 310C. TL2 is the relative transformation measured by LiDAR, i.e. the displacement or distance between the first stop 310A and the third stop 310C. TE2_rel can be compared with TL2.

Then, corrections (also a transformation) can be computed for image-based pose estimations using Eq. (2) as follows:

$$correction = TLi * TEi\_rel\_inverse \qquad \text{Eq. (2)}$$

Figure 3B:
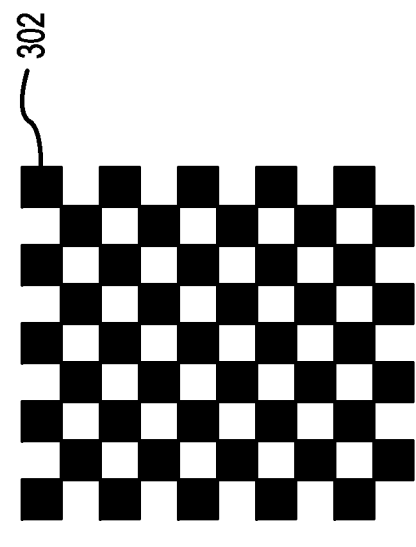
FIG. 3B illustrates an example optical target including a checkerboard pattern, according to some aspects of the disclosed technology.

Corrections can be applied to TE1 at the first stop 310A to establish calibrated target position (e.g. checkerboard position) represented by six degrees of freedom (DOFs). TE1 at the first stop 310A is the reference for all the features (e.g. corners) on the target (e.g. checkerboard). Depending on how object points are constructed in calibrations or pose estimations, the origin of the estimated pose from images can be an upper right corner 302 of a checkerboard 300, as shown in FIG. 3B. 3D coordinates for all other features (e.g. corners) can then be calculated with checker size per design and checkerboard positions in six DOFs can be calibrated using a transformation matrix T as follows:

$$T = \begin{pmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma & x_t \\ \sin\alpha\cos\beta & \sin\alpha\sin\beta\sin\gamma + \cos\alpha\cos\gamma & \sin\alpha\sin\beta\cos\gamma - \cos\alpha\sin\gamma & y_t \\ -\sin\beta & \cos\beta\sin\gamma & \cos\beta\cos\gamma & z_t \\ 0 & 0 & 0 & 1 \end{pmatrix}$$

The transformation matrix includes six DOFs, which include three rotation angles $\alpha$, $\beta$, and $\gamma$ and three translation coordinates $x_t$, $y_t$, and $z_t$. The rotation sequence includes roll by $\gamma$, pitch by $\beta$, then yaw by $\alpha$ when the translations are zero. The rotation is between the world coordinates and the camera coordinates. The translation coordinates are also referred to as 3D coordinates.

With a plane normal to the camera (e.g. rotation angles are 0), 3D coordinates of all features (e.g. corners) can be calculated based on $x_t$, $y_t$, and $z_t$ coordinates and checker size per design of the checkerboard. Then, the transformation matrix can be applied to the 3D coordinates from a previous stop (e.g. first stop) to get the 3D coordinates for the current stop (e.g. second stop). The displacements or distances between stops can be obtained from the 3D coordinates, $x_t$, $y_t$, and $z_t$.

Once the 3D coordinates for all the features (e.g. corners) at the first stop are established, the 3D coordinates for all other stops can be calculated by applying relative transformations or displacements measured from LiDAR sensors. Those 3D points can then be projected onto the image plane by a camera matrix for predicted positions. The camera matrix contains parameters such as focal length, principle points and scale factor. The camera matrix will be verified.

Note that extrinsic (R|t) is not needed since 3D points are represented by 3D coordinates in camera-frames. The discrepancy between predicted and detected positions is the indicator of camera calibration accuracy.

Figure 3C:
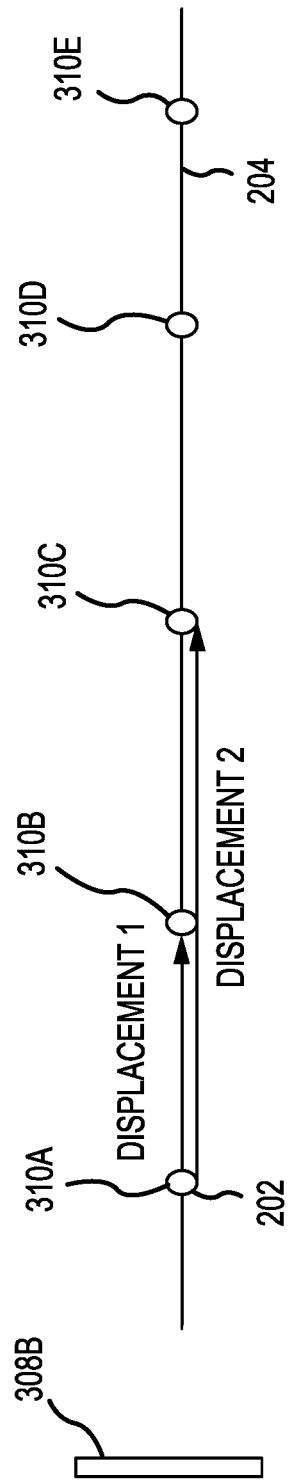
FIG. 3C illustrates example displacements of the camera of FIG. 2 with respect to the linear stage of FIG. 2, according to some aspects of the disclosed technology.

As shown in FIG. 3C, a target 308B is perpendicular to a linear stage 204. Camera 302 can move from a first stop or initial position 310A to stops 310B-E. Displacement 1 is between the first stop 310A and the second stop 310B, which can be measured by LiDAR and can be estimated based upon the images of the target taken at these stops and camera calibrations. Likewise, displacement 2 is between the first stop 310A and the third stop 310C, which can also be measured by LiDAR sensors and can be estimated based upon the images of the target taken at these stops and camera calibrations.

In some variations, at least three targets are used for local length validation.

In some variations, at least five stops are made by the camera for local length validation.

Figure 4:
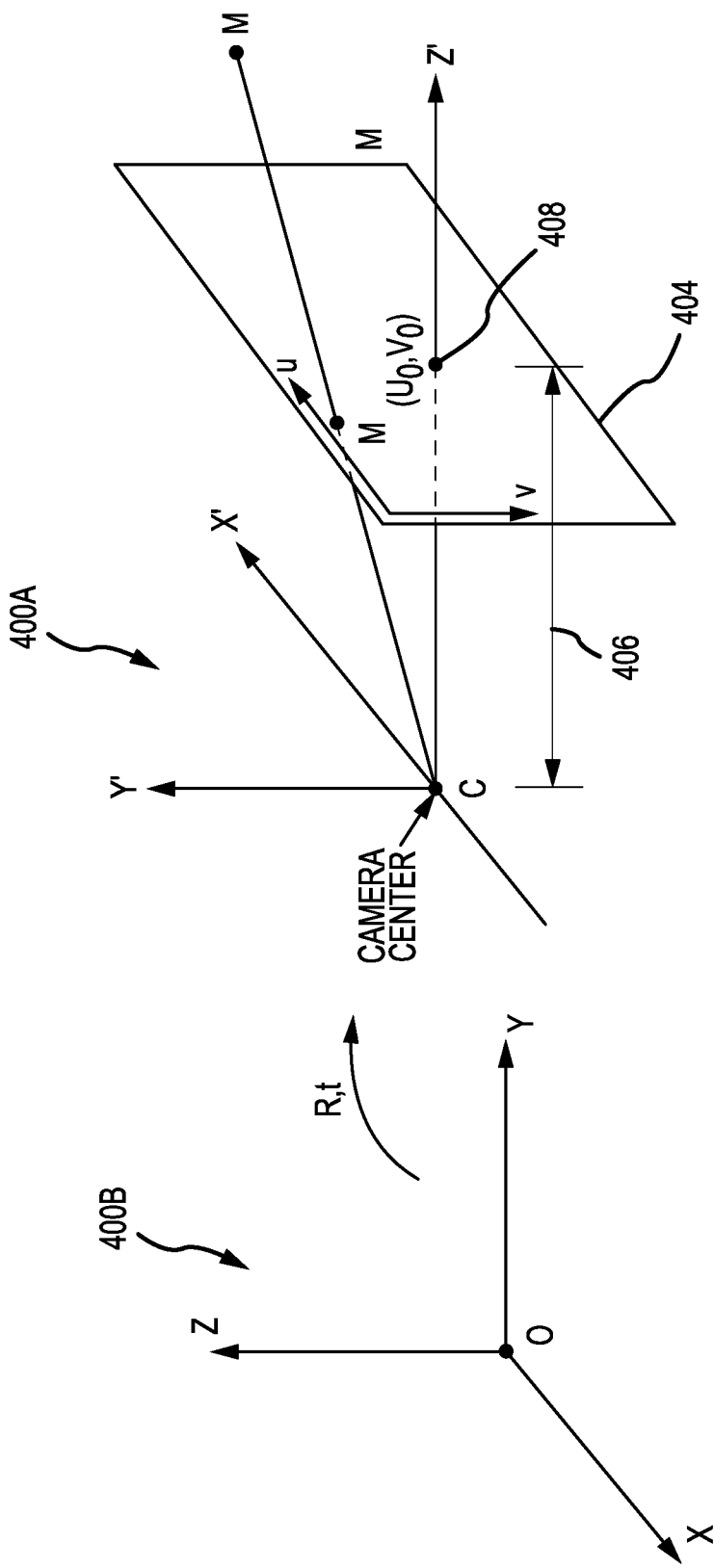
FIG. 4 illustrates camera coordinates X', Y', Z' with an origin located at a camera center and define a focal length from an image plane, according to some aspects of the disclosed technology.

The focal length and image plane are defined in camera coordinates. FIG. 4 illustrates camera coordinates X', Y', and Z' with an origin located at a camera center and define a focal length from an image plane, according to some aspects of the disclosed technology. As shown, camera frame 400A includes camera coordinates X', Y', and Z' that have a camera center 402 at zero coordinates. An image plane 404 intersects with the Z' axis at a focal length 406. The image plane 404 has 2D coordinates along u axis and v axis. The image plane 404 has an intersection with the Z' axis, which has 2D coordinates ($u_0$, $v_0$) and is referred to as principle point 408. A 2D point M is on the image plane 404.

Also, as shown in FIG. 4, world frame 400B includes world coordinates X, Y, and Z. The world coordinates X, Y, and Z can be converted to the camera coordinates by a rotation matrix R and a translation matrix t, which combine to form a transformation matrix.

Figure 5:
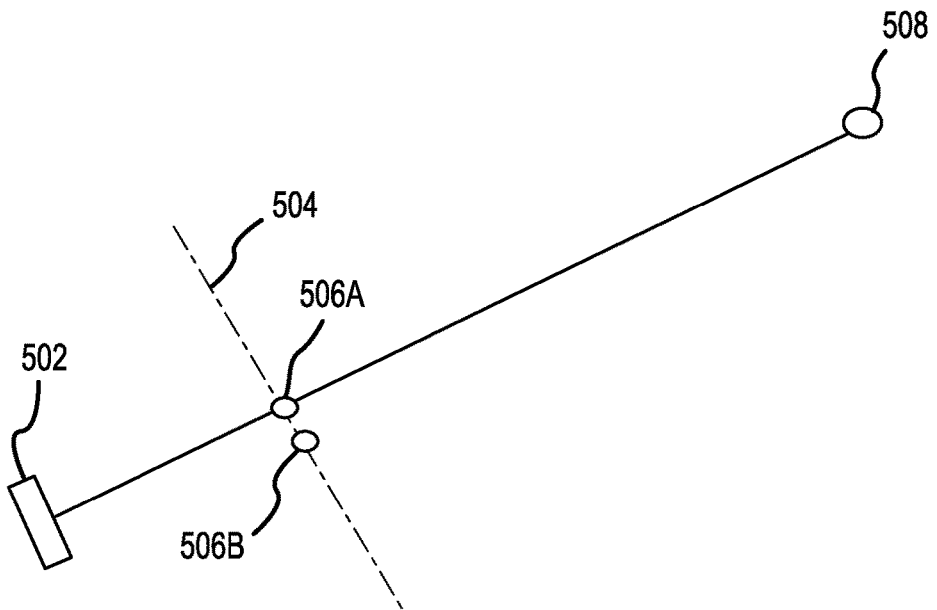
FIG. 5 illustrates errors on the camera plane of FIG. 4, according to some aspects of the disclosed technology.

A calibration error is illustrated in the image plane. FIG. 5 illustrates errors on the image plane of FIG. 4, according to some aspects of the disclosed technology. As illustrated in FIG. 5, a feature 508 is imaged by camera 502 on an image plane 504. Dot 506A is the predicted position on the image plane, while dot 506B is the detected position on the image plane. An error is a distance between dot 506A and dot 506B.

Figure 6A:
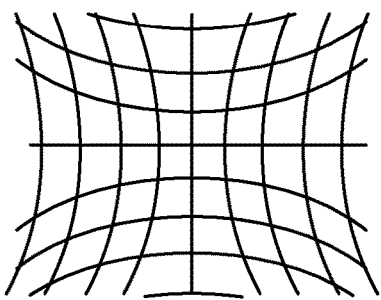
FIG. 6A illustrates an example of image distortion, according to some aspects of the disclosed technology.

Some images may be distorted. Some images may be undistorted. A few examples are provided below. FIG. 6A illustrates an example of image distortion, according to some aspects of the disclosed technology. As illustrated in FIG. 6A, image 600A has a negative radial distortion.

Figure 6B:
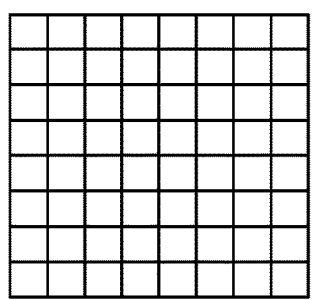
FIG. 6B illustrates an example of an undistorted image, according to some aspects of the disclosed technology.

FIG. 6B illustrates an example of undistorted image, according to some aspects of the disclosed technology. As illustrated in FIG. 6B, image 600B has no distortion.

Figure 6C:
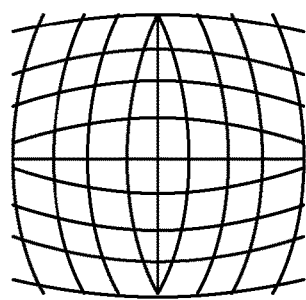
FIG. 6C illustrates another example of image distortion, according to some aspects of the disclosed technology.

FIG. 6C illustrates another example of image distortion, according to some aspects of the disclosed technology. As illustrated in FIG. 6C, image 600C has a positive radial distortion.

To have a linear relationship between focal lengths and displacements, the images from the camera need to be corrected for any distortions for local length validation. For the correction, a checkerboard may be used as a target to get images. The checkerboard has straight lines that are parallel or perpendicular to each other. If there is any distortion, the straight lines would become curved. In other words, a curved line observed from an image of the target indicates the presence of distortion. As such, the distortions can be corrected such that the corrected image of the checkerboard with lines curved no more than 1 pixel.

Figure 7:
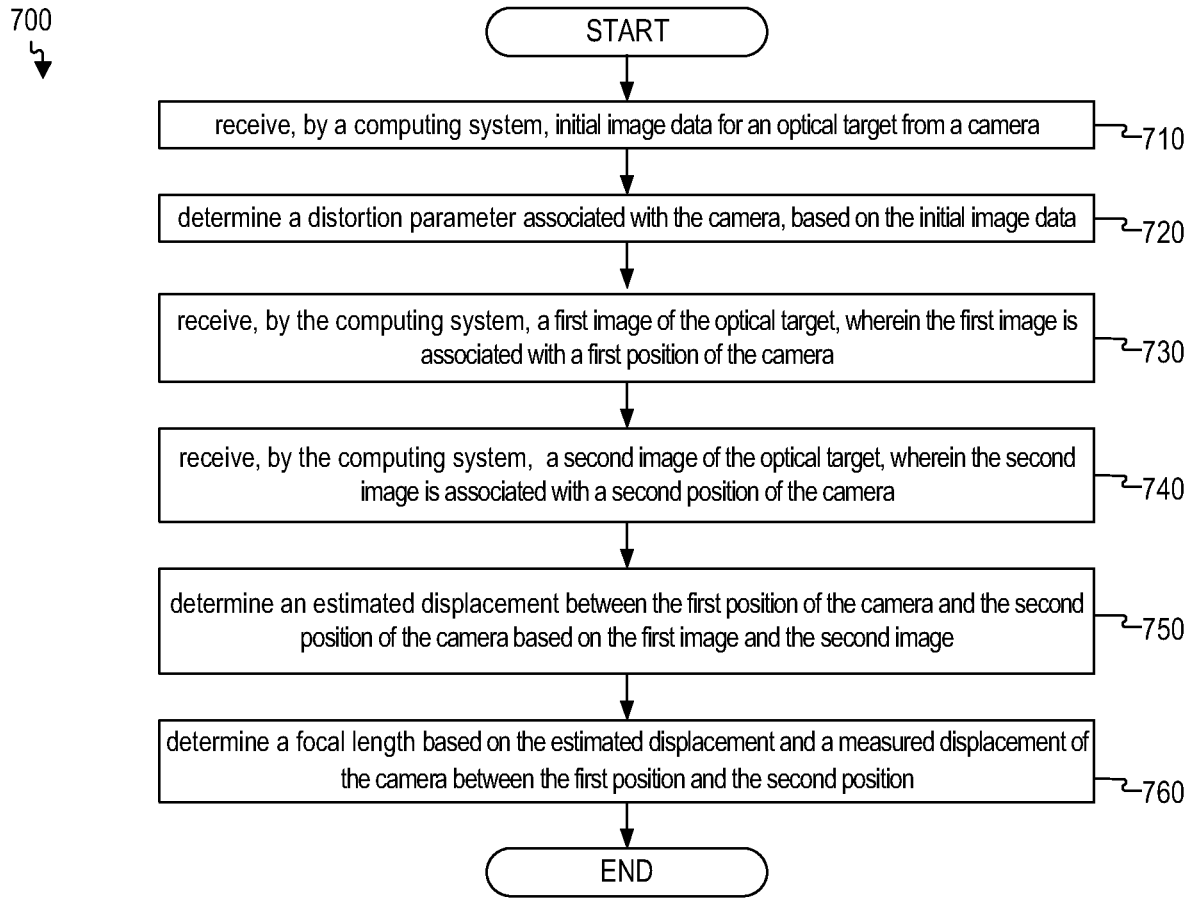
FIG. 7 illustrates an example method for performing focal length validation, according to some aspects of the disclosed technology.

FIG. 7 illustrates an example method 700 for performing focal length validation, according to some aspects of the disclosed technology. Although example method 700 depicts a particular sequence of operations, the sequence may be altered without departing from the scope of the present disclosure. For example, some of the operations depicted may be performed in parallel or in a different sequence that does not materially affect the function of method 700. In other examples, different components of an example device or system that implements method 700 may perform functions at substantially the same time or in a specific sequence.

According to some examples, method 700 includes receiving initial image data for an optical target from a camera at block 1010. For example, the computing system 1100 illustrated in FIG. 11 may receive initial image data for an optical target from a camera.

According to some examples, method 700 includes determining a distortion parameter associated with the camera, based on the initial image data at block 1020. For example, the computing system 1100 illustrated in FIG. 11 may determine a distortion parameter associated with the camera, based on the initial image data.

According to some examples, method 700 includes receiving a first image of the optical target at block 730. For example, the computing system 1100 illustrated in FIG. 11 may receive a first image of the optical target. The first image is associated with a first position of the camera.

According to some examples, method 700 includes receiving a second image of the optical target at block 740. For example, the computing system 1100 illustrated in FIG. 11 may receive a second image of the optical target. The second image is associated with a second position of the camera.

According to some examples, method 700 includes determining an estimated displacement between the first position of the camera and the second position of the camera based on the first image and the second image at block 750. For example, the computing system 1100 illustrated in FIG. 11 may determine an estimated displacement between the first position of the camera and the second position of the camera based on the first image and the second image.

According to some examples, method 700 includes determining a focal length based on the estimated displacement and a measured displacement of the camera between the first position and the second position at block 760. For example, the computing system 1100 illustrated in FIG. 11 may determine a focal length based on the estimated displacement and a measured displacement of the camera between the first position and the second position.

According to some examples, method 700 includes receiving a third image of the optical target. For example, the computing system 1100 illustrated in FIG. 11 may receive a third image of the optical target. The third image is associated with a third position of the camera.

According to some examples, method 700 includes determining an estimated displacement between the first position of the camera and the third position of the camera based on the first image and the second image. For example, the computing system 1100 illustrated in FIG. 11 may determine an estimated displacement between the first position of the camera and the third position of the camera based on the first image and the second image.

In some variations, the focal length is determined based on a ratio of the estimated displacement and the measured displacement.

In some variations, the measured displacement is determined using an optical ranging device.

In some variations, the optical ranging device is a Leica scanner or LiDAR sensor.

In some variations, distortion corrections are performed on the first image and the second image based on the distortion parameter.

In some variations, the first target comprises a checkerboard.

Examples

The following examples are for illustration purposes only. It will be apparent to those skilled in the art that many modifications, both to materials and methods, may be practiced without departing from the scope of the disclosure.

An example method for data collection may include step (1) checking residual distortion after correction with calibration results and make sure that the distortion coefficients meet the specification of lines curved no more than 1 pixel. The method may also include step (2) setting targets at a distance (e.g. 7 meters) away from the camera, and making sure that the three targets are in the middle of the vertical field of views (FOVs), and with yaw at 0°, +45°, and −45°, respectively.

The method may also include step (3) catching target images using the camera, measuring positions of each fiducial on the targets using LiDAR.

The method may also include step (4) moving the camera with a linear stage, catching target images with the camera including positions of each fiducial on the targets, and also measure positions of the camera at each stop on the linear stage with LiDAR.

The method may also include repeating steps (3) to (4) five times.

The method may also include step (6) estimating target positions at each stop using target images, calculating relative transformation between stops. For example, TE1 is a transformation to a first camera frame, TE2 is a transformation to a second camera frame, then a relative transformation TE_rel between a first stop of the camera and a second stop of the camera 2 is TE1_inverse*TE2.

The method may also include step (7) correlating relative transformations between stops from target images with LiDAR measurements, and correct errors in image-based pose estimations.

The method may also include step (8) applying corrections to pose estimations with the image at the first stop to extract target positions, which can then be used in combination with relative transformations TLi for target positions in camera-frames for all the stops of the camera.

The method may also include step (9) calculating predicted positions by projecting 3D points onto the image plane using the camera matrix to be evaluated, and compare the predicted positions with detected image points. Step (9) is repeated for each target at each stop.

Figure 8:
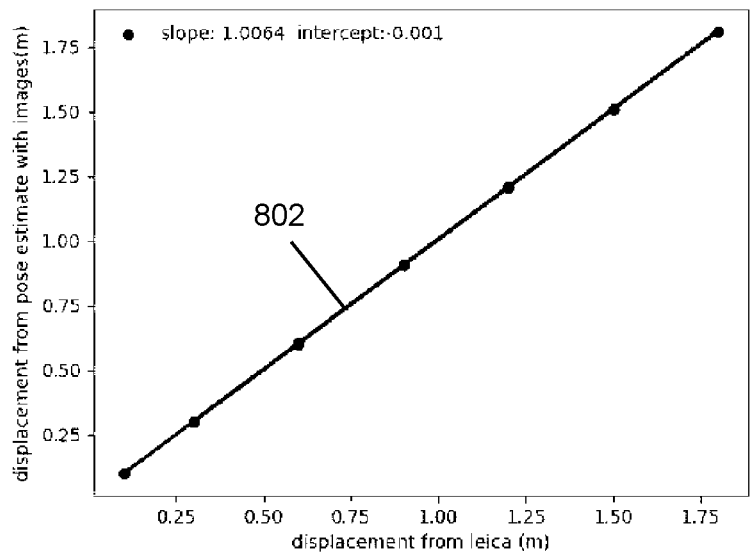
FIG. 8 illustrates displacements from pose estimations with images and measured displacements from a LiDAR sensor or a Leica scanner, according to some aspects of the disclosed technology.

FIG. 8 illustrates displacements from pose estimations with images and measured displacements from LiDAR, according to some aspects of the disclosed technology. As illustrated in FIG. 8, the displacements from pose estimation with images are linearly correlated with the displacements from LiDAR. The slope of line 802 is 1.0064 and the intercept is −0.001.

Figure 9:
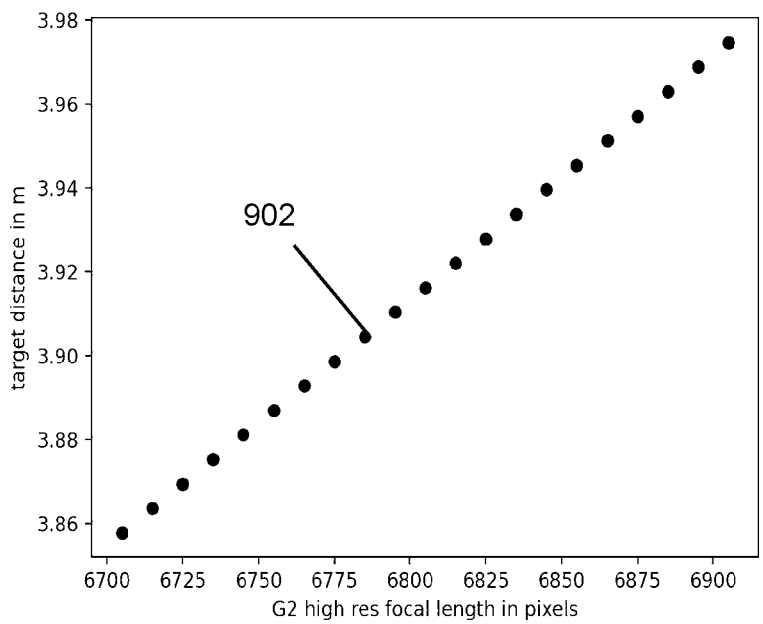
FIG. 9 illustrates simulated results of target distances versus focal lengths, according to some aspects of the disclosed technology.

FIG. 9 illustrates simulated results of target distances versus focal lengths, according to some aspects of the disclosed technology. As illustrated in FIG. 9, target distance is linearly correlated with the focal length as illustrated by dots 902.

The inaccuracy in estimated positions from images may be due to calibration errors. The inaccuracy in estimated positions from images may be linear with calibration errors, if the images are not distorted. As such, the discrepancy between the estimated positions from images and the measured positions from LiDAR correlate well with the calibration errors.

Orientation measurement errors may occur in LiDAR measurements. When LiDAR has an angle resolution of 0.0012 rad, an error of 0.01 pixel is created in the image plane. For a range resolution of 100 µm for LiDAR, fiducials need to be at least 200 mm away from each other with 2× margin.

Range measurement errors may occur in LiDAR measurements due to its limited resolution. As shown in FIG. 8, distances correlate with focal lengths linearly. To detect a 0.1% variation in the focal length, displacement measurements by LiDAR need to have an accuracy of 0.1%, which translates to 100 µm with a 1 m distance between each stop. This is consistent with the LiDAR resolution.

Orientation errors occur from image-based pose estimations. Both the orientation errors in image-based pose estimations and calibration inaccuracy can result in the orientation errors in estimated target orientations, which further cause inaccuracy in coordinates of the 3D points (e.g. coordinates of the corners).

In some aspects, the focal length may be validated automatically on an autonomous vehicle (AV). The AV includes camera and Lidar sensors. When the AV drives linearly, the camera on the AV moves like a linear stage.

Figure 10:
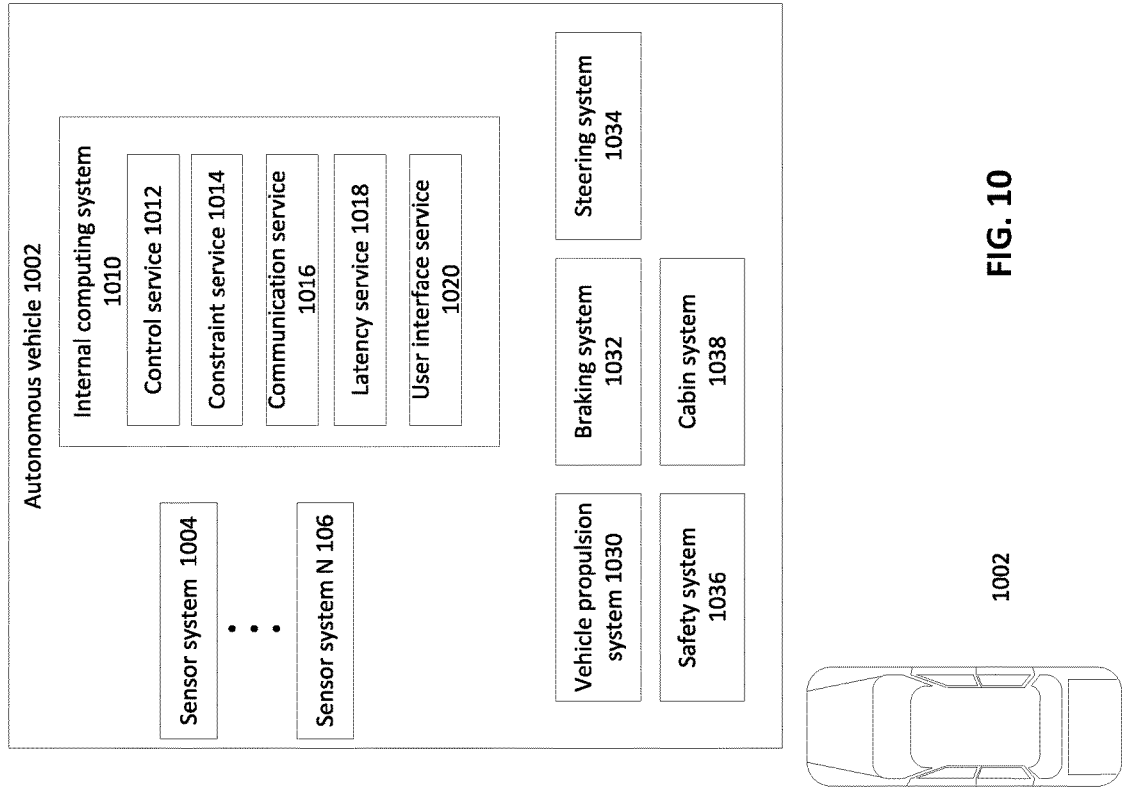
FIG. 10 illustrates an example environment that includes an autonomous vehicle in communication with a remote computing system, according to some aspects of the disclosed technology.
Figure 10:
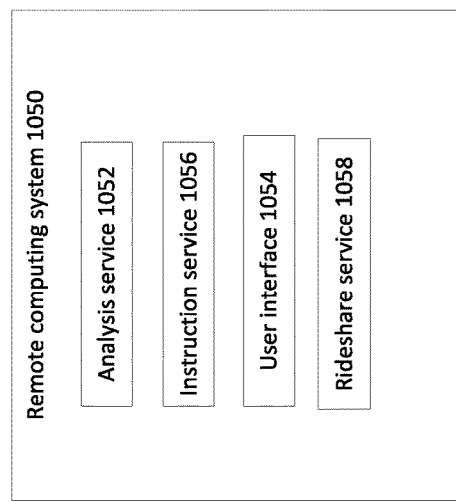

FIG. 10 illustrates environment 1000 that includes an autonomous vehicle 1002 in communication with a computing system 750. The autonomous vehicle 1002 can navigate about roadways without a human driver based upon sensor signals output by sensor systems 1004-1006 of the autonomous vehicle 1002. The autonomous vehicle 1002 includes a plurality of sensor systems 1004-1006 (a first sensor system 1002 through an Nth sensor system 1004). The sensor systems 1004-1006 are of different types and are arranged about the autonomous vehicle 1002. For example, the first sensor system 1004 may be a camera sensor system, and the Nth sensor system 1006 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 1002 further includes several mechanical systems that are used to effectuate the appropriate motion of the autonomous vehicle 1002. For instance, the mechanical systems can include but are not limited to, a vehicle propulsion system 730, a braking system 732, and a steering system 734. The vehicle propulsion system 730 may include an electric motor, an internal combustion engine, or both. The braking system 732 can include an engine brake, brake pads, actuators, and/or any other suitable componentry that is configured to assist in decelerating the autonomous vehicle 1002. The steering system 734 includes suitable componentry that is configured to control the direction of movement of the autonomous vehicle 1002 during navigation.

The autonomous vehicle 1002 further includes a safety system 736 that can include various lights and signal indicators, parking brake, airbags, etc. The autonomous vehicle 1002 further includes a cabin system 738 that can include cabin temperature control systems, in-cabin entertainment systems, etc.

The autonomous vehicle 1002 additionally comprises an internal computing system 1010 that is in communication with the sensor systems 1004-1006 and the mechanical systems 730, 732, 734. The internal computing system includes at least one processor and at least one memory having computer-executable instructions that are executed by the processor. The computer-executable instructions can make up one or more services responsible for controlling the autonomous vehicle 1002, communicating with remote computing system 750, receiving inputs from passengers or human co-pilots, logging metrics regarding data collected by sensor systems 1004-1006 and human co-pilots, etc.

The internal computing system 1010 can include a control service 1012 that is configured to control operation of the vehicle propulsion system 206, the braking system 208, the steering system 210, the safety system 736, and the cabin system 738. The control service 1012 receives sensor signals from the sensor systems 202-204 as well communicates with other services of the internal computing system 1010 to effectuate operation of the autonomous vehicle 1002. In some embodiments, control service 1012 may carry out operations in concert one or more other systems of autonomous vehicle 1002.

The control service 1012 may include the control system 204 as illustrated in FIG. 2 to communicate with the sensors including airbag sensors or accelerators. The control system 204 may also communicate with the release mechanism 206 via high current relay switch 306.

The internal computing system 1010 can also include a constraint service 1014 to facilitate safe propulsion of the autonomous vehicle 1002. The constraint service 1016 includes instructions for activating a constraint based on a rule-based restriction upon operation of the autonomous vehicle 1002. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 1012

The internal computing system 1010 can also include a communication service 1016. The communication service can include both software and hardware elements for transmitting and receiving signals from/to the remote computing system 250. The communication service 1016 is configured to transmit information wirelessly over a network, for example, through an antenna array that provides personal cellular (long-term evolution (LTE), 3G, 5G, etc.) communication.

In some embodiments, one or more services of the internal computing system 1010 are configured to send and receive communications to remote computing system 750 for such reasons as reporting data for training and evaluating machine learning algorithms, requesting assistance from remoting computing system or a human operator via remote computing system, software service updates, ridesharing pickup and drop off instructions etc.

The internal computing system 1010 can also include a latency service 1018. The latency service 1018 can utilize timestamps on communications to and from the remote computing system 750 to determine if a communication has been received from the remote computing system 750 in time to be useful. For example, when a service of the internal computing system 1010 requests feedback from remote computing system 750 on a time-sensitive process, the latency service 1018 can determine if a response was timely received from remote computing system 750 as information can quickly become too stale to be actionable. When the latency service 1018 determines that a response has not been received within a threshold, the latency service 1018 can enable other systems of autonomous vehicle 1002 or a passenger to make necessary decisions or to provide the needed feedback.

The internal computing system 1010 can also include a user interface service 120 that can communicate with cabin system 738 in order to provide information or receive information to a human co-pilot or human passenger. In some embodiments, a human co-pilot or human passenger may be required to evaluate and override a constraint from constraint service 1014, or the human co-pilot or human passenger may wish to provide an instruction to the autonomous vehicle 1002 regarding destinations, requested routes, or other requested operations.

As described above, the remote computing system 750 is configured to send/receive a signal from the autonomous vehicle regarding reporting data for training and evaluating machine learning algorithms, requesting assistance from remoting computing system or a human operator via the remote computing system 750, software service updates, ridesharing pickup and drop off instructions, etc.

The remote computing system 750 includes an analysis service 752 that is configured to receive data from autonomous vehicle 1002 and analyze the data to train or evaluate machine learning algorithms for operating the autonomous vehicle 1002. The analysis service 752 can also perform analysis pertaining to data associated with one or more errors or constraints reported by autonomous vehicle 1002.

The remote computing system 750 can also include a user interface service 754 configured to present metrics, video, pictures, sounds reported from the autonomous vehicle 1002 to an operator of remote computing system 750. User interface service 754 can further receive input instructions from an operator that can be sent to the autonomous vehicle 1002.

The remote computing system 750 can also include an instruction service 756 for sending instructions regarding the operation of the autonomous vehicle 1002. For example, in response to an output of the analysis service 752 or user interface service 754, instructions service 756 can prepare instructions to one or more services of the autonomous vehicle 1002 or a co-pilot or passenger of the autonomous vehicle 1002.

The remote computing system 750 can also include a rideshare service 758 configured to interact with ridesharing applications operating on (potential) passenger computing devices. The rideshare service 758 can receive requests to be picked up or dropped off from passenger ridesharing app 770 and can dispatch autonomous vehicle 1002 for the trip. The rideshare service 758 can also act as an intermediary between the ridesharing app 770 and the autonomous vehicle wherein a passenger might provide instructions to the autonomous vehicle to 1002 go around an obstacle, change routes, honk the horn, etc.

Figure 11:
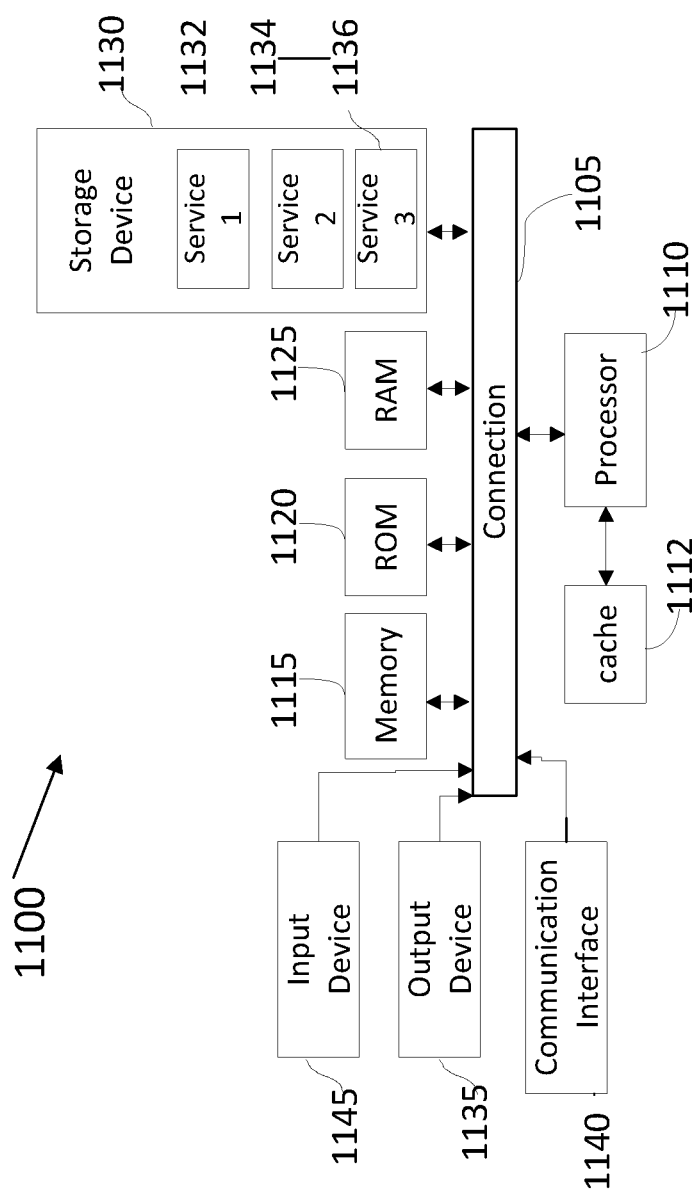
FIG. 11 shows an example of a computing system for implementing certain aspects of the present technology.

FIG. 11 shows an example of computing system 1100, which can be, for example, used for all the calculations as discussed above, or can be any computing device making up internal computing system 1010, remote computing system 1050, (potential) passenger device executing rideshare app 1070, or any component thereof in which the components of the system are in communication with each other using connection 1105. Connection 1105 can be a physical connection via a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache of high-speed memory 1112 connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. There is no restriction on operating on any particular hardware arrangement, and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
    receiving, by a computing system, initial image data for an optical target from a camera;
    determining a distortion parameter associated with the camera, based on the initial image data;
    receiving, by the computing system, a first image of the optical target, wherein the first image is associated with a first position of the camera;
    receiving, by the computing system, a second image of the optical target, wherein the second image is associated with a second position of the camera;
    determining an estimated displacement between the first position of the camera and the second position of the camera based on the first image and the second image; and
    determining a focal length based on the estimated displacement and a measured displacement of the camera between the first position and the second position.

2. The computer-implemented method of claim 1, wherein the focal length is based on a ratio of the estimated displacement and the measured displacement.

3. The computer-implemented method of claim 1, wherein the measured displacement is determined using an optical ranging device.

4. The computer-implemented method of claim 3, wherein the optical ranging device is LiDAR sensor.

5. The computer-implemented method of claim 1, wherein distortion corrections are performed on the first image and the second image based on the distortion parameter.

6. The computer-implemented method of claim 1, wherein the first target comprises a checkerboard.

7. The computer-implemented method of claim 1, further comprising:
    receiving, by the computing system, a third image of the optical target, wherein the third image is associated with a third position of the camera; and
    determining an estimated displacement between the first position of the camera and the third position of the camera based on the first image and the second image.

8. A system comprising:
    a storage device configured to store instructions;
    a processor configured to execute the instructions and cause the processor to:

receive initial image data for an optical target from a camera, determine a distortion parameter associated with the camera, based on the initial image data, receive a first image of the optical target, wherein the first image is associated with a first position of the camera, receive a second image of the optical target, wherein the second image is associated with a second position of the camera, determine an estimated displacement between the first position of the camera and the second position of the camera based on the first image and the second image, and determine a focal length based on the estimated displacement and a measured displacement of the camera between the first position and the second position.

9. The system of claim 8, wherein the focal length is based on a ratio of the estimated displacement and the measured displacement.

10. The system of claim 8, wherein the measured displacement is determined using an optical ranging device.

11. The system of claim 10, wherein the optical ranging device is a Leica scanner or LiDAR sensor.

12. The system of claim 8, wherein distortion corrections are performed on the first image and the second image based on the distortion parameter.

13. The system of claim 8, wherein the first target comprises a checkerboard.

14. The system of claim 8, wherein the processor is configured to execute the instructions and cause the processor to:

receive, by the computing system a third image of the optical target, wherein the third image is associated with a third position of the camera; and determine an estimated displacement between the first position of the camera and the third position of the camera based on the first image and the second image.

15. A non-transitory computer readable medium comprising instructions, the instructions, when executed by a computing system, cause the computing system to:

receive initial image data for an optical target from a camera;

determine a distortion parameter associated with the camera, based on the initial image data;

receive a first image of the optical target, wherein the first image is associated with a first position of the camera;

receive a second image of the optical target, wherein the second image is associated with a second position of the camera;

determine an estimated displacement between the first position of the camera and the second position of the camera based on the first image and the second image; and determine a focal length based on the estimated displacement and a measured displacement of the camera between the first position and the second position.

16. The computer readable medium of claim 15, wherein the focal length is based on a ratio of the estimated displacement and the measured displacement.

17. The computer readable medium of claim 15, wherein the measured displacement is determined using an optical ranging device.

18. The computer readable medium of claim 17, wherein the optical ranging device is a Leica scanner or LiDAR sensor.

19. The computer readable medium of claim 15, wherein distortion corrections are performed on the first image and the second image based on the distortion parameter.

20. The computer readable medium of claim 15, wherein the first target comprises a checkerboard.

* * * * *